Patented May 6, 1952

2,595,217

UNITED STATES PATENT OFFICE 2,595,217

CHLORINATED CAMPHENE-OIL INSECTICIDAL COMPOSITIONS AND METHOD OF MAKING

Thaddeus Parr and Murray Zakheim, Philadelphia, Pa., assignors to The Pennsylvania Salt Manufacturing Company, Philadelphia, Pa., a corporation of Pennsylvania No Drawing. Application March 25, 1948, Serial No. 17,106

17 Claims. (Cl. 167—30)

This invention relates to insecticide compositions and method of manufacture and is more particularly directed to making chlorinated camphene insecticide bases for both insecticide dust and spray composition in which the principal insecticide ingredient is absorbed into a finely divided absorbent solid diluent and to new chlorinated camphene products having improved physical properties, such products being particularly suitable for use in the preparation of further insecticide compositions.

It has been found that when an insecticide ingredient is mixed with a solid diluent, the efficiency of the insecticide is considerably increased if the insecticide ingredient is largely absorbed within the individual particles of the diluent material as against being only mixed therewith. When making insecticide compositions from highly chlorinated camphenes, such, for example, as that referred to in Chemical and Engineering News, October 6, 1947, page 2926, considerable difficulty has been encountered in trying to obtain any appreciable amount of absorption of the insecticide ingredient by the diluent. When such insecticide materials, in their molten state, were poured or sprayed into a finely divided absorbent diluent hard gummy lumps were formed which were very difficult to grind or mill. Also if a spraying procedure were used special equipment was found necessary to maintain the insecticide in a molten state while spraying. It was further noted that very little, if any, of the insecticide material was absorbed by the diluent.

Besides being difficult to spray, chlorinated camphene of over 60% chlorine content and particularly chlorine contents of 67 to 69% are difficult to handle due to their physical properties. These materials have a somewhat waxy appearance, are solid at room temperature and must be heated before they can be readily removed from their containers. On heating, the material becomes extremely tacky when not completely liquid and rapidly sets up on any object with which it comes in contact at temperatures much below 85° C.

This invention is particularly related to solving these problems, its main object being their solution. It is also a primary object of the invention to increase the amount of absorption of the insecticide ingredient by the solid diluent, to form improved insecticide bases from which either dust or spray compositions may be made and to prepare a chlorinated camphene product not having the objectionable physical properties possessed by the chlorinated camphene which can be readily removed at room temperature from containers and can be sprayed without the necessity of separately heating the spray lines.

We have found, if a small quantity of oil (such for example, as a horticultural spray oil) is incorporated in the highly chlorinated camphene while in its molten condition a chlorinated camphene product is obtained that does not possess the tacky characteristics of the chlorinated camphene and that can be readily removed from containers at room temperature without the necessity of heating the same.

The insecticide oil mix while molten is slowly added, either by pouring or spraying, to a finely divided solid diluent while agitating the diluent, that a free flowing mixture is obtained in which a substantial portion of the insecticide ingredient is absorbed by the individual particles of the diluent. Also, by use of this procedure, little or no difficulty is encountered with respect to the formation of hard gummy lumps while the molten chlorinated camphene is being added to the diluent. Furthermore, when the insecticide material is added by spraying, the necessity of special heating equipment for maintaining the insecticide ingredient in its molten state is eliminated.

The oil is preferably admixed with the chlorinated camphene by first heating the oil and adding the insecticide material thereto at sufficiently high temperatures to maintain the insecticide in a fluid state, or the insecticide material and the non-phytotoxic oil are first mixed together and then heated to obtain a fluid material as against first melting the insecticide and then adding the non-phytotoxic oil thereto. However, if desired, the oil may be added to the molten insecticide material and then mixed.

In a preferred method of practicing our invention, 4 to 20 parts by weight of a highly chlorinated camphene having a chlorine content of over 60% is intimately mixed, while in its molten state, with 1 to 5 parts of a non-phytotoxic oil. The chlorinated camphene-oil mix, while still in a molten state, is then slowly added to 42 to 80 parts by weight of a solid absorbent diluent while the diluent is being agitated. The agitation of the solid diluent is preferably continued for a period after all of the chlorinated camphene-oil mix has been added to insure proper blending of the materials.

The following are some specific examples of insecticide preparations in which our invention is used. These examples show various preferred ways of practicing the invention. However, they are given by way of example and illustration only it being apparent that the invention can be practiced in other ways not specifically set forth in the examples given.

*Example 1*

Approximately 20 parts by weight of a chlorinated camphene having 67 to 69% chlorine content were placed together with 2 parts by weight of a horticultural spray oil (having a viscosity of 39 at 100° F. and a flash point of 275° F.) in a tank to be heated. The temperature of the chlorinated camphene and oil mix was brought up to 80 to 85° C. While the chlorinated camphene and oil were being heated, approximately 78 parts by weight of an Attapulgite (a fuller's earth type of diluent), preferably of sufficient fineness to pass a 325 screen, were placed in a ribbon blender. After the chlorinated camphene and oil were thoroughly mixed, the molten mix was slowly added to the Attapulgite in the blender the blending being continued for 15 to 20 minutes. The charge was then dumped. After this premixing, the product was milled to the desired particle size and packed for shipping.

*Example 2*

Approximately 2 parts by weight of oil were heated in a tank to which was slowly added approximately 40 parts by weight of molten chlorinated camphene, 67 to 69% chlorine content, after which the whole was mixed at a temperature preferably not in excess of 125° C. until a thorough mix was obtained. After all of the chlorinated camphene had been added and the whole mix was in a fluid state, the temperature was allowed to drop to 90 to 100° C. so as to prevent possible decomposition of the chlorinated camphene at the elevated temperature. The chlorinated camphene-oil mix was added, by being either dripped or sprayed, to approximately 57 parts by weight of finely divided Attapulgite in a ribbon blender while said blender was in operation the material being blended for at least 30 minutes. The premix was then milled to the desired particle size after which it was packed for shipment.

The oil in this example was a horticultural spray oil having a viscosity at 100° F. of 39 and a flash point of 275° F.

*Example 3*

An excellent insecticide base was prepared by using substantially the same proportions and procedure of Example No. 1 and substituting a clay of the kaolin type in place of the Attapulgite.

In each of the above examples no difficulty was encountered with the insecticide ingredient hardening into lumps or forming sticky masses in the blender and it was further noted on examining the final product that the major portion of the insecticide ingredient was absorbed within the individual particles of the diluent.

In practicing the invention, it is not necessary to use the particular non-phytotoxic oils, the particular solid diluents, or the particular proportions of insecticide and oil given in the above examples. The oil selected should be an organic liquid, preferably of oily character, miscible with the molten chlorinated camphene insecticide material, non-toxic to plants and should not decompose at the temperatures to which it is necessary to heat the insecticide ingredient used, it generally being preferable that the oil be substantially stable up to temperatures of about 120° C. The oil should also preferably have a flash point above 120° C., and S. S. U. viscosity rating at 100° F. of not above 210, and a boiling point above 120° C., or, if the oil is a mixture, at least 90% of the material should boil above 120° C. In actual practice oils consisting of non-phytotoxic hydrocarbon mixtures boiling above 200° C. are generally preferred for practical and economic reasons. However, other oily materials which fulfil the above requirements have proved quite satisfactory. Some of the specific oily materials which have been satisfactorily used are lubricating oil (SAE #10), alkylated naphthalenes (of the type prepared by Velsicol Corporation) and hydrogenated naphthas.

The diluent used may be any material which has absorptive qualities, is not injurious to plants or animals and will not destroy the toxic properties of the insecticide ingredient used. Among such materials which have been found to make satisfactory diluents are: Kaolin type clays, diatomaceous earth, and various fuller's earths types of diluents.

With respect to the necessary proportions, we have found it preferable to use just sufficient oil to produce a highly viscous fluid mix with the chlorinated camphene. If not enough oil is used there is a tendency for the insecticide ingredient to separate out before it can be absorbed by the solid diluent used and if too much oil is used setting or solidifying of the insecticide within the solid diluent might be prevented and an oily rather than a dry mix be obtained. However, larger or smaller amounts may be used with improved results being obtained over the old processes, the amount of oil used being somewhat dependent on the exact results desired.

When the chlorinated camphene-oil product is to be marketed as such for its ease of handling and later blending with other ingredients for preparing insecticide compositions, it is preferred that the ratio of oil to chlorinated camphene be approximately 1 part by weight of oil to 10 to 20 parts by weight of chlorinated camphene, such chlorinated camphene-oil compositions being used in the preceding Examples 1 and 2.

We claim:

1. A method of making an insecticide dust and spray base comprising mixing a major portion of a normally solid chlorinated camphene while in its molten state with a minor portion of an oil having a S. S. U. viscosity rating at 100° F. of less than 210 and a boiling point above 120° C. for at least 90% of its ingredients, slowly adding said chlorinated camphene-oil mix to a solid absorbent diluent material while agitating said diluent and continuing said agitation until said chlorinated camphene-oil mix is thoroughly incorporated within said diluent material.

2. A method of making insecticide compositions in which there is a solid absorbent diluent material the individual particles of which have a substantial amount of a highly chlorinated camphene absorbed therein comprising thoroughly mixing 4 to 20 parts by weight of a chlorinated camphene containing over 60% chlorine by weight while in a molten state with 1 to 5 parts by weight of an oil having a S. S. U. viscosity rating at 100° F. of less than 210 and a boiling point above 120° C. for at least 90% of its ingredients, slowly adding said chlorinated camphene-oil mix while in a molten state to 42 to 80 parts of a solid absorbent diluent while agitating said diluent and continuing said agitation until said chlorinated camphene-oil mix is thoroughly incorporated within said diluent material.

3. The method of claim 2 in which the oil is a non-phytotoxic oil.

4. The method of claim 2 in which the oil has a flash point above 120° C.

5. The method of claim 2 in which the chlorinated camphene has a chlorine content of 67 to 69% by weight of combined chlorine.

6. The method of claim 5 in which the oil has a flash point above 120° C.

7. The method of claim 1 in which the ratio of oil to chlorinated camphene used is 1 part by weight oil to 10 to 20 parts by weight chlorinated camphene.

8. A method of making insecticide compositions comprising adding 1 to 5 parts by weight of an oil having a S. S. U. viscosity rating at 100° F. of less than 210 and a boiling point above 120° C. for at least 90% of its ingredients to 4 to 20 parts by weight of a molten chlorinated camphene having a chlorine content of at least 60% combined chlorine by weight, mixing said chlorinated camphene and oil at a temperature of 80 to 125° C. until a thorough mix is obtained and thereafter spraying said mix while in a molten state on a solid absorbent diluent while agitating said diluent.

9. A method of making an insecticide dust and spray base comprising mixing a major portion of a normally solid chlorinated camphene while in its molten state with a minor portion of an oil having an S. S. U. viscosity rating of 100° F. of less than 210 and a boiling point above 120° C. for at least 90% of its ingredients, adding said chlorinating camphene-oil mix to a solid absorbent diluent material and agitating the chlorinated camphene-oil mix and absorbent diluent until said chlorinated camphene-oil mix is thoroughly incorporated within said diluent material.

10. The product prepared by the process of claim 9.

11. The product prepared by the process of claim 2.

12. The product prepared by the process of claim 5.

13. A new product of manufacture suitable for the preparation of insecticide compositions comprising chlorinated comphene having at least 60% combined chlorine by weight in which has been dissolved while the chlorinated camphene is in a fluid state obtained by heating an oil having a S. S. U. viscosity rating at 100° F. of less than 210 and a boiling point above 120° C. for at least 90% of its ingredients, the ratio of oil to chlorinated camphene being 1 part by weight oil to 10 to 20 parts by weight chlorinated camphene.

14. The product of claim 13 in which said oil is a nonphytotoxic oil.

15. The product of claim 13 in which said oil has a flash point above 120° C.

16. The product of claim 13 in which said chlorinated camphene has a chlorine content of 67 to 69% by weight.

17. The product of claim 16 in which said oil has a flash point above 120° C.

THADDEUS PARR.
MURRAY ZAKHEIM.

REFERENCES CITED

The following references are of record in the file of this patent:

UNITED STATES PATENTS

| Number | Name | Date |
|---|---|---|
| 2,420,295 | Biehn et al. | May 13, 1947 |
| 2,423,457 | Lynn et al. | July 8, 1947 |

FOREIGN PATENTS

| Number | Country | Date |
|---|---|---|
| 547,874 | Great Britain | Sept. 15, 1942 |

OTHER REFERENCES

Chem. and Engr. News, Oct. 6, 1947, p. 2926.

Parker et al., "Toxaphene, A Chlorinated Hydrocarbon With Insecticidal Properties," Univ. of Del. Agr. Expt. Station, Bulletin No. 264, Tech. No. 36, February, 1947.